United States Patent

[11] 3,599,677

| [72] | Inventor | Patrick W. O'Brien<br>Springhead, near Oldham, England |
|---|---|---|
| [21] | Appl. No. | 655,303 |
| [22] | Filed | July 24, 1967 |
| [45] | Patented | Aug. 17, 1971 |
| [73] | Assignee | Compoflex Company Limited<br>Lumb Hill, Delph, near Oldham,<br>Lancashire, England |
| [32] | Priority | Sept. 28, 1966 |
| [33] | | Great Britain |
| [31] | | 43,397/66 |

[54] FLEXIBLE TUBING AND THE MANUFACTURE THEREOF
22 Claims, 1 Drawing Fig.

[52] U.S. Cl. .................................................. 138/122,
138/121, 138/137
[51] Int. Cl. ...................................................... F16l 11/04,
F16l 11/08
[50] Field of Search........................................... 138/121,
122, 125, 137, 138; 156/210, 293, 294; 161/134,
135, 136, 137, 139

[56] References Cited
UNITED STATES PATENTS

| 2,936,812 | 5/1960 | Roberts | 138/137 X |
| 3,028,291 | 4/1962 | Roberts | 138/121 X |
| 3,043,612 | 7/1962 | Pavlik | 138/121 X |
| 3,083,736 | 4/1963 | Roberts | 138/125 X |
| 3,280,847 | 10/1966 | Chisholm | 138/121 |
| 3,330,303 | 7/1967 | Fochler | 138/121 X |

*Primary Examiner*—Herbert F. Ross
*Attorney*—Cushman, Darby and Cushman

ABSTRACT: A flexible hose for tubing is described which has a seamless plastic inner lining, a relatively thick rubber cover extruded about the outside of the inner lining and a relatively thin outer rubber cover surrounding the thick cover. The wall of the inner lining has inner and outer annular corrugations each of which extend around the lining and is parallel to the other corrugations. A layer of reinforcing filaments is spirally wound about the outside of the inner lining, and these filaments become partially embedded in the thick rubber cover when the latter is extruded over the inner lining. A second layer or spirally wound reinforcing filament may be placed between the thick cover and the thinner outer cover.

PATENTED AUG 17 1971  3,599,677
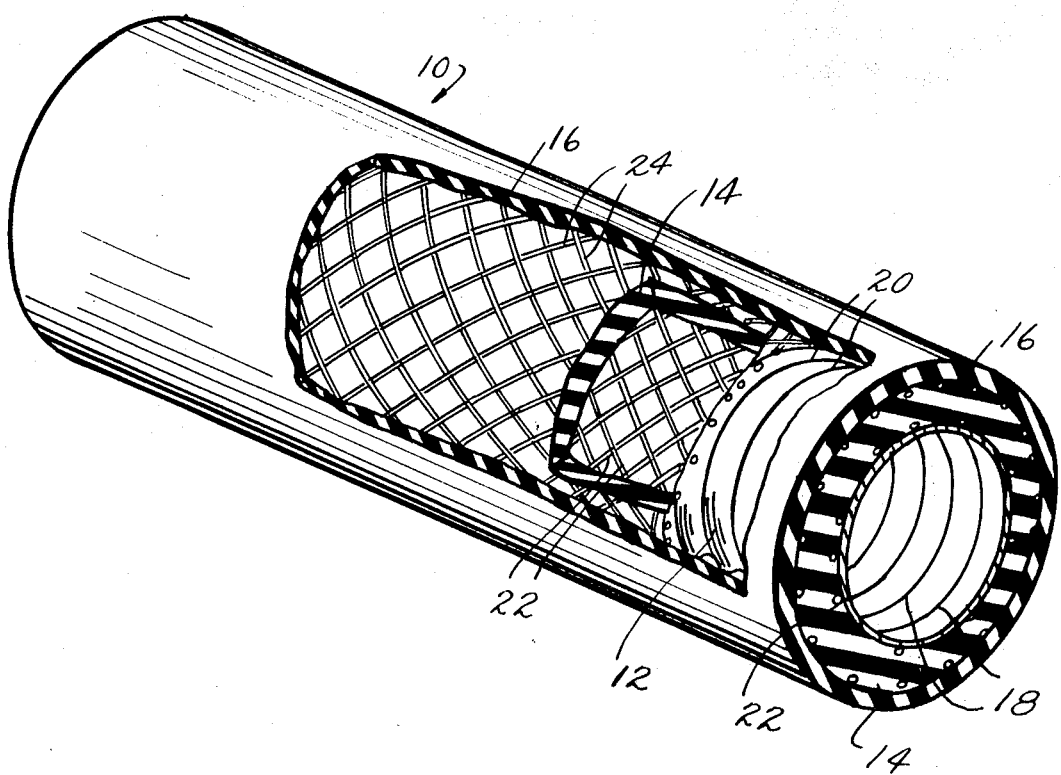
INVENTOR
PATRICK W. O'BRIEN
BY Cushman, Darby & Cushman
ATTORNEYS

FLEXIBLE TUBING AND THE MANUFACTURE THEREOF

This invention relates to improvements in flexible tubing and in the manufacture thereof.

Such a tube has been made with circumferential corrugations but when used for the conveyance of liquids or gases it is limited in the pressure that it can take, by the wall thickness of the hose which must necessarily be comparatively thin to retain flexibility and also such a hose tends to elongate under pressure due to its configuration. Further than that the hose is susceptible to damage by abrasion when dragged along say a concrete floor, due to the relatively thin wall of material.

The invention aims at providing:

a. A hose having a seamless liner which, dependent upon the material of the liner chosen, will be resistant to a vast range of conveyants, e.g. in the case of a polypropylene liner this hose would be resistant to acids.

b. A hose resistant to crush.

c. A hose capable of withstanding considerable pressure due to its construction.

d. A hose not subject to excessive dilation or elongation due to the construction and reinforcement.

The sole FIGURE illustrating a preferred embodiment shows a flexible hose 10 which includes a seamless plastic inner lining 12, a relatively thick rubber cover 14 extruded about the outside of the inner lining 12 and a relatively thin outer rubber cover 16 surrounding the main cover 14. The wall of the lining 12 has inner and outer annular corrugations 18, 20 each of which extends around the lining 12 and is parallel to the other corrugations. A layer of reinforcing 22 is spirally wound about the outside of the lining 12, these filaments 22 becoming partially embedded in the cover 14 when the latter is extruded over the lining 12. A second layer of spirally wound reinforcing filaments 24 is present between the main cover 14 and the outer cover 16.

In the preferred embodiment a flexible hose or tube 10 is provided with a plastic inner lining 12 with corrugations on the outer side thereof which may be arranged either helically or in parallel relation along its tubular length and upon which at least one layer of material is superimposed. The corrugations are shown in the drawing as being in parallel relation. Suitable plastics for lining 12 are polyvinyl chloride, polythene, polypropylene, nylon or such derivatives of polytetrafluoroethylene as are capable of extrusion from a screw extruder, polyvinylchloride/nitrile, polyvinyl acetate and acrylo nitrilo butadiene styrene (ABS), ethylene vinyl acetate (EVA) silicone elastomers, any mixture of polyolefines and ethylene vinyl acetate, fluoro-ethylene-propylene and polyurethane. The expression "polyvinylchloride/nitrile" means either polyvinylchloride plasticized by nitrile rubber or nitrile plasticized by polyvinylchloride. Rubber, synthetic rubber or a compound thereof or other soft material may be applied, either in sheet or strip form to the outside of the lining 12 which is of such softness as will enable it to fill the corrugations forming cover 14. The said inner lining is preferably seamless and may be provided with inner as well as outer corrugations 18 and 20. The said corrugations may be of varying pitch and may be rounded or of saw teeth configuration. Layers of other material such as rubber or synthetic rubber coated cloth may be built upon the inner lining and within the rubber or other layer above referred to by spiral winding or other usual method. This spirally wound material is shown as 22 in the drawing. It will be understood that the hose retains its flexibility in large measure after the rubber or other soft material has been filled in the outer corrugations.

The said inner lining 12 and cover 14 may be reinforced with braided cotton, wire or plastic braid, as shown at 24 in the drawing which may if desired be covered with an outer cover 16 of rubber, synthetic rubber or a compound thereof or of plastic.

The rubber immediately adjacent to the plastic liner will fill the convolutions and form a mechanical key such that the liner becomes an integral part of the finished hose as the rubber will bond with the coated fabric or braiding 22 which, in turn, bonds to the cover if applied.

The said lining may be covered by an extruded cover 14 comprised of rubber or synthetic rubber or a compound thereof or any known plastic, for example polyvinyl chloride, polythene, polypropylene, ethylene vinyl acetate, polyurethane, polyurethane foam with or without a smooth outer surface, silicone elastomers, any mixture of polyolefines, any mixture of polyolefines and ethylene vinyl acetate, polyvinyl chloride foam and fluoroethylene propylene.

A reinforcement for the lining 12 may be inserted between the lining and the extruded cover 14 which may consist of cotton, wire or braid made of any plastic or elastomer. In addition the said lining may comprise stockinette knitting, knitted on to the lining or circular woven fabric woven on the lining as a reinforcement. Wires or strings of filament 22 or spun synthetic or natural fibers may also be arranged circumferentially around the length of the lining especially when it is desired to limit elongation thereof. These wires or strings may be discrete or they may be incorporated within the extruded cover or interleaved between the cover and the reinforcement, as shown in the drawing. The reinforcement or the cover or both may include layers of fabric and these and any of the substances used for the cover or reinforcement may be applied in sheet or strip form. Any such layers may be applied by spiral winding. It is also to be understood that when necessary an outer cover 16 of rubber may be applied and the whole vulcanized. Alternatively, an outer cover or covers of fabric may be applied if necessary reinforced with a helix of metal or plastic wire.

I claim:

1. A flexible tube comprising a seamless extruded plastic inner lining having annular corrugations spaced longitudinally on the inner wall and the outer wall thereof in a parallel relationship, said corrugations being formed in said lining during the extrusion thereof, a soft elastomeric material applied to the outer wall of said inner lining, said soft elastomeric material billing said corrugations on said outer wall, at least one outer layer of material superposed on said soft material and at least one reinforcing layer incorporated into said tube structure radially outwardly of said inner lining.

2. A flexible tube according to claim 1 wherein said corrugations are in the form of a helix.

3. A flexible tube according to claim 1 wherein said lining consists of polyvinyl chloride.

4. A flexible tube according to claim 1 wherein said lining consists of polythene.

5. A flexible tube according to claim 1 wherein said lining consists of polypropylene.

6. A flexible tube according to claim 1 wherein said lining consists of nylon.

7. A flexible tube according to claim 1 wherein said lining consists of such derivatives of polytetrafluoroethylene as are capable of extrusion from a screw extruder.

8. A flexible tube according to claim 1 wherein said lining consists of polyvinylchloride/nitrile.

9. A flexible tube according to claim 1 wherein said lining consists of polyvinyl acetate.

10. A flexible tube according to claim 1 wherein said lining consists of acrylo nitrilo butadiene styrene (ABS).

11. A flexible tube according to claim 1 wherein said lining consists of ethylene vinyl acetate (EVA).

12. A flexible tube according to claim 1 wherein said lining consists of a silicone elastomer.

13. A flexible tube according to claim 1 wherein said lining consists of a mixture of polyolefines and othylene vinyl acetate.

14. A flexible tube according to claim 1 wherein said lining consists of a fluoro-ethylene-propylene.

15. A flexible tube according to claim 1 wherein said lining consists of polyurethane.

16. A flexible tube according to claim 1 wherein said corrugations are of varying pitch.

17. A flexible hose according to claim 1 wherein said corrugations are rounded.

18. A flexible tube according to claim 1 wherein said corrugations are of saw tooth formation.

19. A flexible tube according to claim 1 having an outer cover of elastomer.

20. A flexible tube according to claim 1 having an outer cover of plastic material.

21. A flexible tube according to claim 1 wherein said reinforcing layer is embedded in said soft material.

22. A flexible tube according to claim 1 wherein said reinforcing layer includes spirally wound filaments.

UNITED STATES PATENT OFFICE
CERTIFICATE OF CORRECTION

Patent No. 3,599,677      Dated August 17, 1971

Inventor(s) Patrick William O'BRIEN

It is certified that error appears in the above-identified patent and that said Letters Patent are hereby corrected as shown below:

<u>Claim 1</u>, line 7, "billing" should read --- filling --- .

Signed and sealed this 30th day of May 1972.

(SEAL)
Attest:

EDWARD M. FLETCHER, JR.       ROBERT GOTTSCHALK
Attesting Officer      Commissioner of Patents